Jan. 6, 1953  A. W. MAGNUSON  2,624,119
MEASURING INSTRUMENT
Filed Feb. 27, 1950
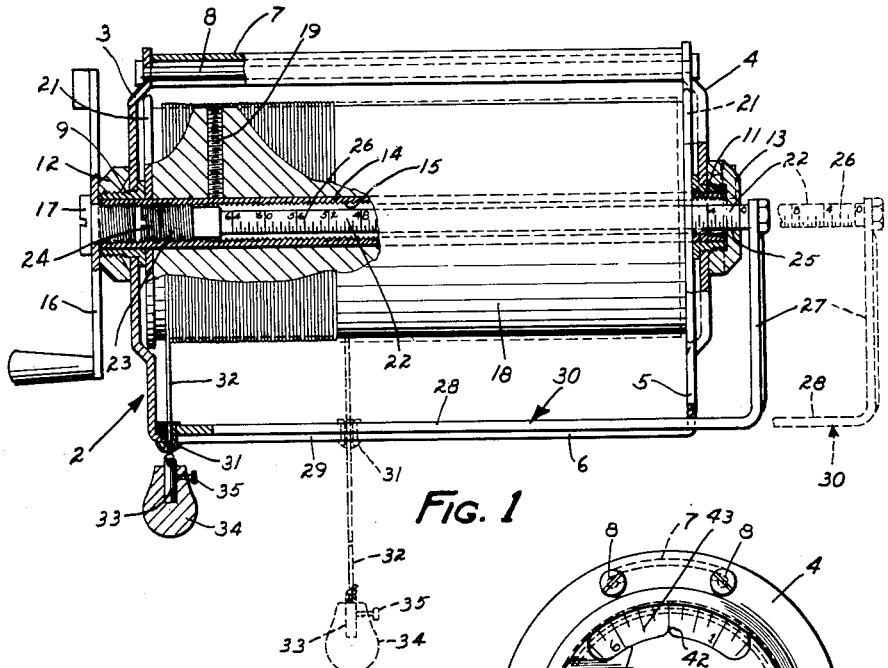
INVENTOR.
AMIEL W. MAGNUSON
BY
Paul, Paul & Moore
ATTORNEYS Patented Jan. 6, 1953

2,624,119

UNITED STATES PATENT OFFICE 2,624,119

MEASURING INSTRUMENT

Amiel W. Magnuson, Minneapolis, Minn.

Application February 27, 1950, Serial No. 146,457

4 Claims. (Cl. 33—126.5)

This invention relates to new and useful improvements in measuring instruments, and more particularly to such an instrument for conveniently measuring distance between vertically spaced points.

The novel measuring instrument herein disclosed has been found very useful when fishing to measure the distance at which a baited hook should be supported in the water to catch the most fish. It also lends itself for many other uses as, for example, a plumbline.

Briefly, the instrument comprises a reel or spool mounted upon a suitable shaft provided with a crank for conveniently rotating the spool. A cord or line is wound about the spool and has a weight secured to its free end, whereby it may be quickly precipitated into the water to the desired depth, or distance to determine the distance between two points.

An important object of the invention therefore is to provide a simple, inexpensive measuring instrument which is so constructed that the distance between two points may be quickly determined after which the line or cord may be rewound upon the spool to permit storage of the instrument in a tool box or other storage space.

A further object is to provide a measuring instrument comprising a suitable frame having a hollow shaft rotatably supported therein, and a suitable spool or reel being mounted upon and secured to said shaft and having a line coiled thereabout, and a level winding device being associated with the spool for guiding the line axially along the length thereof, as it is wound thereon, whereby the convolutions of the line will be spaced closely together lengthwise of the spool so that each revolution of the spool may represent a predetermined length of line, which may be indicated in feet or inches, as may be desired upon a suitable scale.

A further object is to provide a simple and inexpensive measuring instrument of the class described, comprising few parts, all of which are so assembled that the instrument may be produced at low cost, and which, when assembled and completed for use, provides a very neat and attractive instrument which may be conveniently carried in a tackle box or other small storage space when not in use.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side elevational view of the instrument partially in section to show the construction thereof;

Figure 2 is an end view of the instrument;

Figure 3 is a perspective view of the stem for indicating the length of line unwound from the spool;

Figure 4 is a detailed view showing a fitting adapted to be secured to the free end of the line or cord, whereby the line may be engaged with a board or corner of a building or other object to be measured; and Figure 5 is a view showing a similar device of slightly different construction.

The novel instrument herein disclosed is shown comprising a suitable frame, generally designated by the numeral 2, composed of end members 3 and 4, similar in construction, and provided at their lower ends with depending portions 5 shown connected together by a member 6, which may be integrally formed with the end members 3 and 4 to simplify construction.

A spacing element 7, preferably formed as best shown in Figures 1 and 2, is interposed between the upper marginal portions of the end members 3 and 4 to assure accurate spacing thereof. Tie bolts 8 are engaged with the hooked ends of the cross member 7 and have their end portions received in suitable apertures provided in the end plates 3 and 4. The member 7 and tie bolts 8 thus cooperate with the lower connecting member 6 to provide a rugged frame structure.

Suitable flanged bushings 9 and 11 are mounted in apertures provided in the end frame members 3 and 4, and are secured in position therein by clamping nuts 12 and 13, respectively. The bushings 9 and 11 are preferably made of bronze or some other material suitable for bearings, and they are bored to rotatably support a tubular shaft 14. The shaft 14 is internally threaded, as best shown at 15 in Figure 1.

A balanced crank handle 16, similar to the cranks used on fishing reels, is secured to one end of the tubular shaft 14 by a suitable screw 17, shown received in threaded engagement with the threaded bore of the tubular shaft 14.

A spool or reel, generally designated by the numeral 18, is mounted upon the tubular shaft 14 and is secured thereto in fixed relation by suitable means such as a set screw 19, which may be received in a threaded aperture provided in the body of the spool, whereby its inner end may engage the peripery of the tubular shaft and thus secure the spool thereto, as will be understood by reference to Figure 1.

In the drawings, the spool 18 is shown as composed of a solid body having end plates 21 secured thereto which it will be noted are engaged with the inner faces of the bushings or bearings 9 and 11, whereby the spool 18 is restrained against axial movement between the end members 3 and 4 of the supporting frame. It is to be understood that, if desired, the spool may be made of tubular stock or in any other form applicable for the purpose, without departing from the scope of the invention.

An important feature of the present invention resides in the means provided for indicating the distance at which the line has been unwound from the spool. To thus indicate the length of the unwound portion of the line, an elongated stem 22 is mounted within the threaded bore of the tubular shaft 14, and is provided at one end with a head 23 received in threaded engagement with the bore of the shaft. A stop element 24 is also received in threaded engagement with the bore of the tubular shaft 14 and is arranged to be engaged by the adjacent end of the head 23, thereby to limit axial movement of the stem 22 in one direction. The adjustably mounted stop 24 also serves to align the zero mark of a scale 26 with a fixed point, such as the end face of the nut 13. See Figure 1.

The opposite end of the stem 22 is slidably received in a guide aperture 25 provided in the clamping nut 13. The stem 22 is preferably square in cross section, and the guide opening 25 in the nut 13 is similarly shaped whereby the stem is restrained against rotation when the spool is rotated to unwind or wind the line thereonto. By thus supporting the stem 22 within the tubular shaft 14, when the spool is rotated, the threaded bore of the tubular shaft 14 will impart axial movement to the stem 22 because of its head 23 being received in threaded engagement with the shaft 14.

Such movement of the stem 22 will thus indicate to the user of the instrument the length of line which has been unwound from the spool. The outwardly projecting end of the stem 22 has a threaded terminal 20 received in an aperture provided in the upright leg 27 of an angle shaped member 30 having a horizontal leg 28 slidably supported in a guide opening provided in the tie member 6 of the supporting frame, as indicated in Figure 1. A nut is received in threaded engagement with the terminal 20 to secure the leg 27 to the stem 22. The tie member 6 has an elongated slot 29 therein in which a tubular rivet 31 is slidably mounted. The rivet is secured to one end of the horizontal leg 28 of the L-shaped member 30 and serves as a guide for the line or cord 32 coiled about the spool or reel 18. Because of the L-shaped member 30 being secured to the projecting end of the stem 22, the tubular rivet 31 will be moved along in the slot 29, as indicated by the dotted lines in Figure 1, thereby accurately guiding the line onto the reel or therefrom, depending upon the direction of rotation of the crank 16. In other words, the rivet 31 serves as a level winder for the line during the operation of winding the line onto the spool by manipulation of the crank 16.

A cylindrical element 33 is secured to the free end of the line 32, and a weight 34 may be detachably secured to the element 33 by a suitable clamping screw 35, as will be understood by reference to Figure 1.

A hook element 36 may be substituted for the weight 34, as shown in Figure 4, whereby the free end of the line may be hooked to a corner of a wall or some other fixed object in the operation of measuring the distance between two points. The hook element 36, shown in Figure 4, may be detachably secured to the element 33 by suitable clamping screws 37, as shown.

In Figure 5, there is shown a hook element 38 which functions in a manner somewhat similar to the hook member 36, shown in Figure 4. The hook element 38 is shown having an I-bolt 39 adjustably secured thereto, to the upper end of which the usual line 32 may be secured in the usual manner.

The novel apparatus herein disclosed has been found very practical and convenient for fishermen to quickly determine the depth at which a baited hook should be retained in the water. It is compact and small and when the line is completely wound thereon, as shown in full lines in Figure 1, the instrument may readily be carried in a pocket or tackle box without any trouble whatsoever.

The pitch of the internal threads 15 of the hollow shaft 14 is preferably based upon the diameter of the string or cord 32. For example, if the thread is cut 32 threads to an inch, the cord should preferably be $\frac{1}{32}$ of an inch in diameter so that for each revolution of the spool, the measuring rod or stem 22 would be axially projected from the end of the apparatus $\frac{1}{32}$ of an inch.

The diameter of the spool should also be such that for each revolution thereof, a predetermined length of line would be unwound therefrom, as for example, the diameter of the spool might be made six inches in circumference, whereby six inches of line would be unwound from the spool for each revolution thereof. The graduations on the stem 22 would also be spaced $\frac{1}{32}$ of an inch apart, whereby the length of line unwound from the spool might quickly be determined by simply noting the scale or graduations on the projected end of the measuring stem, indicated by the dotted lines in Figure 1.

A suitable opening 41 is shown provided in the end wall 4 of the frame having a pointer 42 adapted to register with scale marks 43 provided on the end of the spool, thereby to indicate the portion of a revolution the spool may have rotated when measuring the distance between two points. In other words, if the measuring scale 26 on the stem 22 indicates that eight feet of line has been unwound from the spool, the fraction of rotation of the spool may be clearly noted through the opening 41, as shown in Figure 2, whereby the operator may quickly note the exact distance the line has been unwound from the spool.

While the novel instrument herein disclosed has been found particularly useful for fishermen, it is to be understood that it may be used for many other purposes where applicable without departing from the scope of the invention.

I claim as my invention:

1. A measuring instrument comprising a frame including end members having aligned bearings therein, a tubular interiorly threaded shaft mounted in said bearings, a reel supported on the shaft and secured thereto for direct rotation with the shaft, a line coiled about the reel and having one end secured thereto, a crank for rotating the reel, a line measuring device including an elongated element normally having its major portion disposed within the hollow shaft and having one end projecting from one of the shaft supporting bearings, the inner end of said element having an enlarged head received in threaded engagement with the shaft whereby when the reel is rotated to unwind a portion of the line, said measuring element is projected from one end of the reel to indicate the length of line unwound from the reel, wherein the line guide is L-shaped and has one leg slidably mounted in said frame and having its other leg secured to the projecting end of the measuring element for direct movement therewith.

2. A measuring instrument in accordance with claim 1, wherein means is provided for limiting axial movement of the line measuring element in one direction, whereby it will always come to rest in the same position with respect to the instrument frame, when the entire line is wound onto the spool, said means comprising an exteriorly threaded plug received in threaded engagement with the interior of said shaft in position to be engaged by the inner end of the measuring element.

3. A measuring instrument comprising a frame including spaced end members having bearings therein, a hollow shaft mounted in said bearings and carrying a reel, a crank secured to one end of said shaft, said shaft being internally threaded and having one end of an elongated measuring element mounted therein, said element having indicating marks thereon spaced equi-distant apart the length of said element, the axial spacing between said indicating marks corresponding substantially to the pitch of the internal threads of the shaft, said measuring element having an enlarged head at its inner end received in threaded engagement with the internal threads of said shaft, a line guide secured to the opposite end of said element and movable therewith, when the instrument is in use, and a line coiled about said reel and having one end secured thereto adjacent one end thereof and having a running connection with said guide, the diameter of said line being substantially equal to the pitch of the threads of said shaft whereby a predetermined length of line is unwound from the reel each time the reel is rotated one revolution, said indicating marks visually indicating to the operator the total length of line unwound from the reel.

4. A measuring instrument according to claim 3, wherein the line guide is L-shaped and comprises angularly disposed legs, one of which is slidably supported in said frame, and the other of said legs having its terminal secured to the projecting end of the measuring element.

AMIEL W. MAGNUSON.

REFERENCES CITED

The following references are of record in the file of this patent:

UNITED STATES PATENTS

| Number | Name | Date |
| --- | --- | --- |
| 72,801 | Coffman | Dec. 31, 1867 |
| 538,109 | Hamilton | Apr. 23, 1895 |
| 539,995 | Nason | May 28, 1895 |
| 781,401 | Chappell | Jan. 31, 1905 |
| 2,276,302 | Guttmann | Mar. 17, 1942 |
| 2,489,614 | Brikoff | Nov. 29, 1949 |